United States Patent
Harel et al.

(10) Patent No.: US 8,750,811 B2
(45) Date of Patent: Jun. 10, 2014

(54) METHOD, APPARATUS AND SYSTEM FOR PHASE DIFFERENCE ADJUSTMENT IN TRANSMIT DIVERSITY

(75) Inventors: Haim Harel, New York, NY (US); Sherwin J. Wang, Towaco, NJ (US)

(73) Assignee: Google Inc., Mountain View, CA (US)

( * ) Notice: Subject to any disclaimer, the term of this patent is extended or adjusted under 35 U.S.C. 154(b) by 546 days.

(21) Appl. No.: 12/046,672

(22) Filed: Mar. 12, 2008

(65) Prior Publication Data

US 2008/0227415 A1 Sep. 18, 2008

Related U.S. Application Data

(60) Provisional application No. 60/906,826, filed on Mar. 14, 2007.

(51) Int. Cl.
*H03C 7/02* (2006.01)
*H04B 1/02* (2006.01)

(52) U.S. Cl.
USPC ........ 455/101; 455/103; 455/115.2; 455/123; 455/69; 455/522

(58) Field of Classification Search
USPC .......... 455/39, 522, 69, 123–127.4, 103–105, 455/101, 115.1–115.4
See application file for complete search history.

(56) References Cited

U.S. PATENT DOCUMENTS

| 5,642,353 | A | 6/1997 | Roy, III et al. |
| 5,832,044 | A | 11/1998 | Sousa et al. |
| 5,991,330 | A | 11/1999 | Dahlman et al. |
| 5,999,826 | A | 12/1999 | Whinnett |
| 6,131,016 | A * | 10/2000 | Greenstein et al. ............. 455/69 |
| 6,185,440 | B1 | 2/2001 | Barratt et al. |
| 6,226,509 | B1 | 5/2001 | Mole et al. |
| 6,236,363 | B1 | 5/2001 | Robbins et al. |
| 6,330,294 | B1 | 12/2001 | Ansbro et al. |
| 6,343,218 | B1 | 1/2002 | Kaneda et al. |
| 6,392,988 | B1 | 5/2002 | Allpress et al. |
| 6,492,942 | B1 | 12/2002 | Kezys |
| 6,636,495 | B1 | 10/2003 | Tangemann |
| 6,704,370 | B1 | 3/2004 | Chheda et al. |
| 6,745,009 | B2 | 6/2004 | Raghothaman |
| 6,754,473 | B1 * | 6/2004 | Hwang et al. ................. 455/101 |
| 6,810,264 | B1 | 10/2004 | Park et al. |

(Continued)

FOREIGN PATENT DOCUMENTS

EP 0 986 193 3/2000
EP 1 282 242 2/2003

(Continued)

OTHER PUBLICATIONS

Derryberry et al., "Transmit Diversity in 3G Coma Systems", Wideband Wireless Access Technologies to Broadband Internet, IEEE Communications Magazine, Apr. 2002, pp. 68-75.

(Continued)

*Primary Examiner* — Edward Urban
*Assistant Examiner* — Rui Hu
(74) *Attorney, Agent, or Firm* — Gottlieb, Rackman & Reisman, PC

(57) ABSTRACT

A method and apparatus for using an antenna selection signal for selecting a transmit diversity parameter, including phase difference and/or power ratio between concurrently transmitting antennas.

6 Claims, 2 Drawing Sheets

(56) References Cited

U.S. PATENT DOCUMENTS

| | | | |
|---|---|---|---|
| 6,859,643 | B1 | 2/2005 | Ma et al. |
| 6,882,228 | B2 | 4/2005 | Rofougaran |
| 7,116,944 | B2* | 10/2006 | Das et al. .................. 455/69 |
| 7,321,636 | B2 | 1/2008 | Harel et al. |
| 7,366,247 | B2* | 4/2008 | Kim et al. .................. 375/267 |
| 7,369,814 | B2* | 5/2008 | Lucidarme et al. ........ 455/69 |
| 7,395,032 | B2* | 7/2008 | Kaipainen et al. ......... 455/101 |
| 7,660,598 | B2* | 2/2010 | Barnett et al. ............. 455/522 |
| 7,729,714 | B2* | 6/2010 | Black et al. ................ 455/522 |
| 7,941,104 | B2* | 5/2011 | Lim et al. .................. 455/101 |
| 2003/0002594 | A1* | 1/2003 | Harel et al. ................ 375/299 |
| 2003/0017835 | A1* | 1/2003 | Bergel ....................... 455/502 |
| 2003/0112880 | A1 | 6/2003 | Walton et al. |
| 2003/0124995 | A1* | 7/2003 | Tanaka ....................... 455/101 |
| 2004/0048584 | A1 | 3/2004 | Vaidyanathan et al. |
| 2004/0072594 | A1* | 4/2004 | Hwang et al. ............. 455/562.1 |
| 2004/0085239 | A1 | 5/2004 | Ukena et al. |
| 2004/0127175 | A1* | 7/2004 | Lucidarme et al. ........ 455/101 |
| 2004/0162021 | A1 | 8/2004 | Seki et al. |
| 2005/0059355 | A1 | 3/2005 | Liu |
| 2005/0143113 | A1 | 6/2005 | Lee et al. |
| 2005/0181736 | A1* | 8/2005 | Cao et al. .................. 455/69 |
| 2007/0099578 | A1* | 5/2007 | Adeney et al. ............ 455/69 |
| 2008/0242243 | A1* | 10/2008 | Kikuchi ..................... 455/101 |
| 2009/0023401 | A1* | 1/2009 | Grandhi et al. ............ 455/101 |
| 2013/0343493 | A1* | 12/2013 | Kludt et al. ................ 375/340 |

FOREIGN PATENT DOCUMENTS

| | | |
|---|---|---|
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/72464 | 11/2000 |
| WO | WO 00/79701 | 12/2000 |
| WO | WO 01/69814 | 9/2001 |
| WO | WO 01/78254 | 10/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

NTT Docomo, "Performance Evaluation of Closed Loop-Based Antenna Switching Transmit Diversity in E-Utra Uplink", 3GPP TSG RAN WG1#47, Jan. 15, 2007.

Nortel, "Adaptation between Closed-loop and Open-loop Switching Transmit Diversities for UL MIMO", 3GPP TSG-RAN VVG1#48, Feb. 12, 2007.

International Search Report for International Application No. PCT/US2008/057098 mailed Aug. 13, 2008.

* cited by examiner

METHOD, APPARATUS AND SYSTEM FOR PHASE DIFFERENCE ADJUSTMENT IN TRANSMIT DIVERSITY

CROSS REFERENCE TO RELATED APPLICATIONS

This application claims the benefit of U.S. Provisional Patent Application No. 60/906,826, filed on Mar. 14, 2007, which is incorporated in its entirety herein by reference.

FIELD OF THE INVENTION

This invention relates generally to the field of wireless communications and more specifically to determining, adjusting and/or optimizing a phase difference between two antennas in a transmitter with a plurality of antenna elements.

BACKGROUND OF THE INVENTION

A transmitting communication device, for example, a mobile transmitter, may have multiple antenna elements that may be used to transmit signals to communicate information. In some multiple antenna transmitters, only one of the antenna elements or antennas may transmit a signal at any one time, for example, using a switching unit to direct a signal to one antenna or to another antenna. A receiver, for example, a base station, may provide the mobile transmitter with feedback regarding which antenna provides better transmission.

An example of antenna selection transmit diversity as is known may be found in "Closed Loop-Based Antenna Switching Transmit Diversity in E-UTRA Uplink," dated November 2006. That paper describes the E-UTRA, in which the user equipment (UE) has the capability for two-branch antenna diversity reception, and the use of antenna switching transmit diversity. In the context of known solutions such as the one described therein, only one antenna transmits at any one time, and the antenna selection method is used to select only one antenna for the transmission. See also "Adaptation between Closed-loop and Open-loop Switching Transmit Diversities for UL MIMO," February 2007.

SUMMARY OF EMBODIMENTS OF THE INVENTION

The present invention relates to the use of an antenna selection signal, for example, in the context of antenna switched transmit diversity (ASTD) protocol, for the purpose of beam-forming, for example, determining, adjusting, or otherwise optimizing a phase difference between two antennas in a transmit diversity system.

Communication may be performed by a transmitting communication device with a plurality of antenna elements, for example, a mobile unit. An antenna selection signal may be received from a receiving communication device, for example, a base station. A complex weighting may be calculated based on the antenna selection signal. A modulated pre-transmission signal may be modified based on the complex weighting to produce a set of modified pre-transmission signals. Each modified pre-transmission signal from the set of modified pre-transmission signals may be uniquely associated with an antenna element from the plurality of antenna elements. The set of modified pre-transmission signals may be sent from the plurality of antenna elements to produce a transmitted signal. The complex weighting may be associated with total power of the transmitted signal and at least one from a phase rotation and a power ratio associated with each antenna element from the plurality of antenna elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
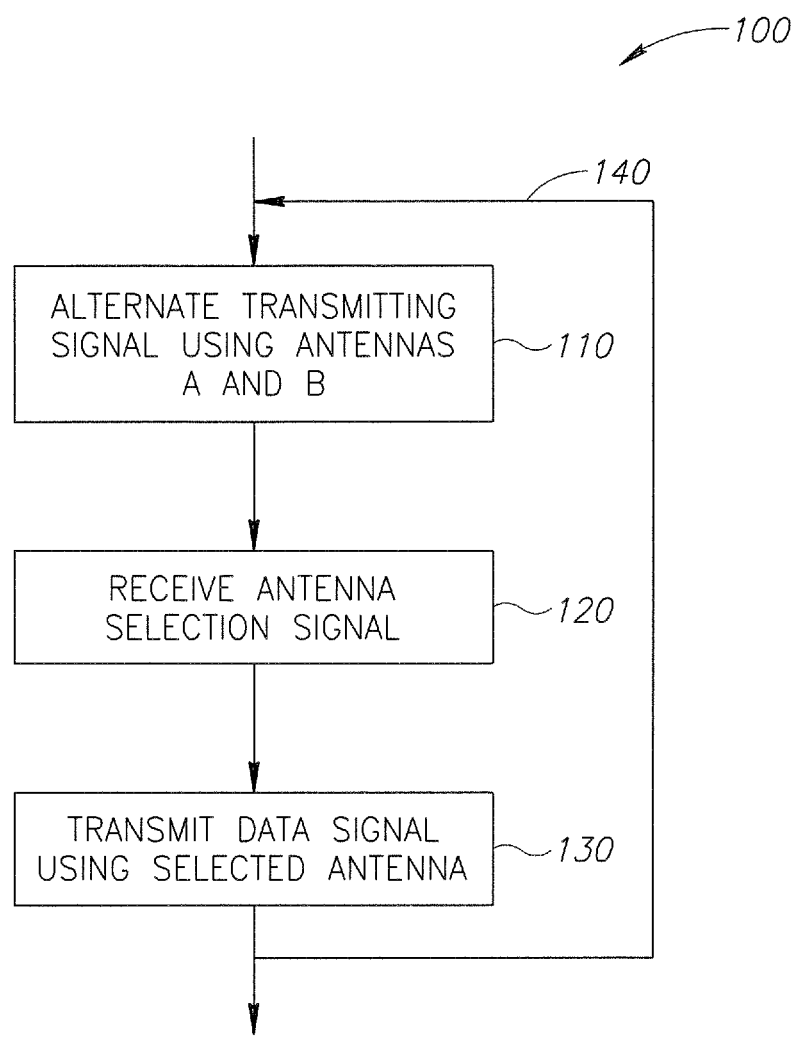
FIG. 1 depicts a flow diagram of a known method of selecting an antenna for transmission from a plurality of antennas.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

One embodiment of a communication system in connection with the present invention may include a mobile transmitter, also referred to as a modifying communication device, that that adjusts a nominal value of a transmit diversity parameter, for example, a phase difference and/or a power ratio between a signal transmitted on a first antenna and a second antenna. Although the embodiments described in the present application are described as using two antennas, it will be recognized that the present invention is equally applicable to transmit diversity systems and devices having more than two antennas.

According to the embodiment, transmitter may, for example, perturb a signal at a perturbation rate and transmit the signal to a receiving communication device, also referred to as a feedback communication device. Feedback communication device may receive the transmit diversity signal at an antenna and transmit/receive module, process the received signal using a processor, and transmit feedback information that describes the signal quality as received by feedback communication device. It will be recognized that there may be a variety of ways for the feedback device to provide this signal quality indication. In one embodiment described herein, the power control bit (PCB) may be used as a signal quality indicator. In other embodiments one or more feedback parameters, including antenna selection and/or dedicated transmit diversity feedback parameters, may be used additionally or alternatively. Modifying communication device may adjust a nominal value of at least one transmit diversity parameter at a nominal value adjustment rate based on the feedback information.

According to the illustrated embodiment, the network may operate to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

The communication network may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 100 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

The communication network in connection with the present invention may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of the network may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network may include one or more modifying communication devices and one or more feedback communication devices that communicate via a wireless link. Either or both of the modifying and feedback communication devices and may be any device operable to communicate information via signals with one or more other communication devices. For example, either of the communication devices may comprise a mobile subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

In some embodiments of the invention, the feedback communication device may be a base station, and the modifying communication device may be a subscriber unit.

Either or both of the communication devices or may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between the communication devices such as a wireless link may be a radio frequency link that is cellular in network organization. Wireless link may be used to communicate a signal between the communication devices.

As described more fully below, according to embodiments of the present invention, modifying communication device may include a processor and a transmit/receive module that calculate and produce one or more signals for transmission over at least first and second antennas.

Feedback communication device may include a processor and transmit/receive module that generate and transmit a feedback signal that indicates the quality of the modified signal as received at the feedback communication device. Modifying communication device may then modify the transmit signal in accordance with feedback information corresponding to the feedback signal.

According to one embodiment, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device. According to one embodiment, modifying a signal may be described as adjusting a nominal value of a transmit diversity parameter. As described more fully herein, according to an embodiment of the invention, modulation of a transmit diversity parameter during a perturbation cycle may comprise transmitting using a transmit diversity parameter deviating from the nominal value in a first direction during a first portion of the perturbation cycle and then transmitting using a transmit diversity parameter deviating from the nominal value in a second direction during a second portion of the perturbation cycle.

According to one embodiment of operation of the invention, modifying communication device may modify a signal by perturbing the signal. Perturbing a signal may refer to modulating a signal feature of the signal in relation to a nominal value of the signal, for example, modifying the signal feature in a first direction for a first feedback interval, and in a second direction for another feedback interval. A perturbation cycle may refer to a first modulation in a first direction and a second modulation in a second direction. In some embodiments of the invention, a perturbation cycle may comprise a different, e.g., longer or more complex, sequence of modulations. As an example with respect to phase, a perturbation may include modulating the phase difference in a first direction, and modulating the phase difference in a second direction. If the feedback information provided by the feedback communication device indicates an improvement in the signal received using one perturbation modulation direction compared to the signal received using the other perturbation modulation direction, the next nominal value adjustment may be made in the improved direction in an amount less than or equal to the modulation.

According to embodiments of the invention, the nominal value of a transmit diversity parameter may be perturbed at a first rate, designated the perturbation rate, and the nominal value of the transmit diversity parameter may be adjusted at a second rate, designated the nominal value adjustment rate. The perturbation rate and the nominal value adjustment rates may be the substantially the same or they may be different, and each one may be substantially the same or different than the feedback rate.

In an embodiment of the present invention, feedback communication device may transmit to modifying communication device a power control signal, for example, one or more power control bits, or any type or group of power control signals may be used. A power control signal may indicate to the modifying communication device that it should raise or lower its power. For example, based on the parameter being modulated, a "quality up" outcome value may instruct modifying communication device to increase the total power of its transmitted signal, and a "quality down" outcome value may instruct modifying communication device to decrease the total power. An outcome value may comprise, for example, a power control bit of a CDMA power control signal, for which "0" represents a command to increase power and a "1" represents a command to decrease power. Thus, for example, a bit value of "1" requesting a decrease in power may indicate "quality up," and a bit value of "0" requesting an increase in power may indicate "quality down." Some CDMA or W-CDMA protocols may allow for additional outcomes, for example, no change in power.

Figure 2:
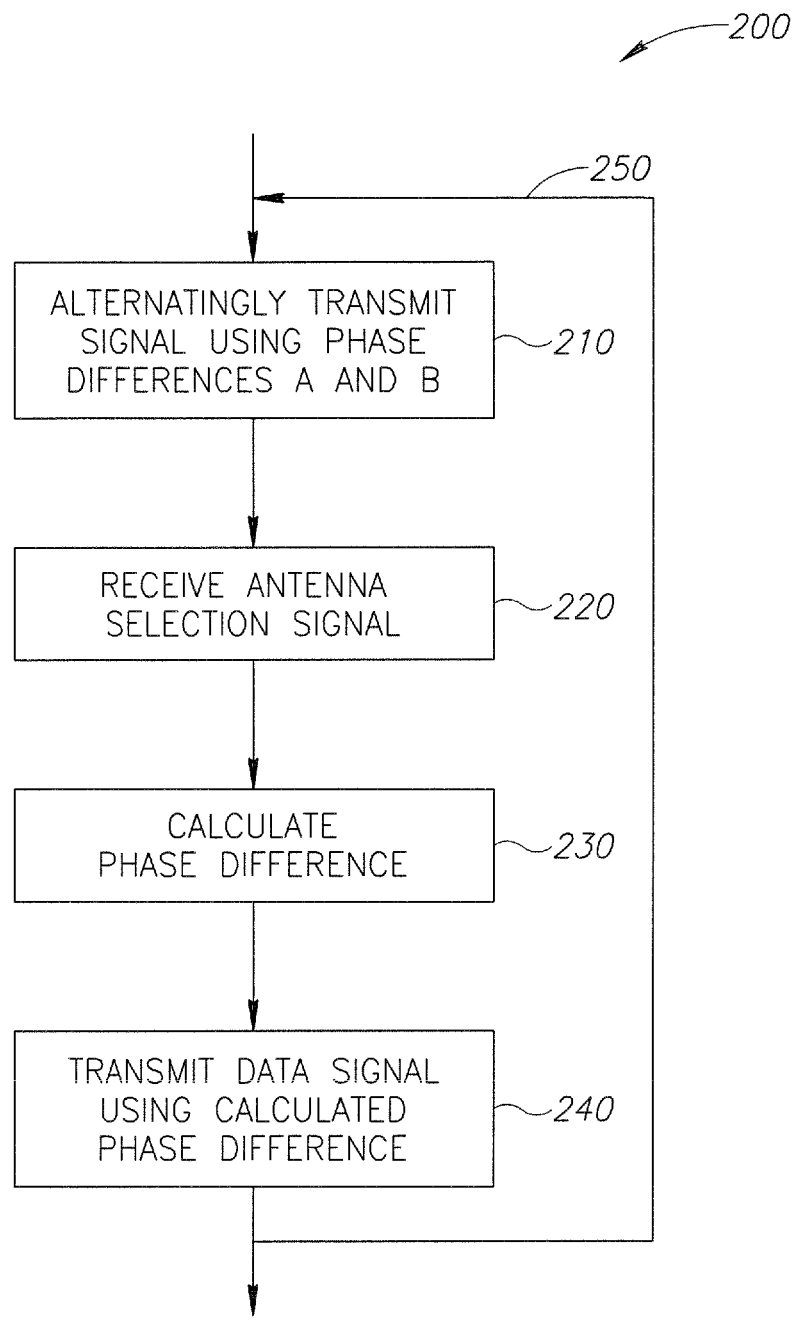
FIG. 2 is a schematic flow diagram of a method of selecting a phase difference in transmit diversity using an antenna selection signal in accordance with the present invention.

Embodiments of the present invention and its advantages are best understood by referring to FIGS. 1 through 2 of the drawings, like numerals being used for like and corresponding parts of the various drawings.

FIG. 1 depicts a flow diagram of a known method of selecting an antenna for transmission (100), by which the transmitter may alternatingly transmit a signal using the first and second antennas for a test period (110), receive an antenna selection signal from the receiver indicating which antenna is preferred (120), and then transmit a data signal using the selected antenna indicated by the antenna selection signal (130). The process may be repeated (140) as required by the antenna selection protocol, for example, every frame, every slot, every N slots, etc.

FIG. 2 is a schematic flow diagram of a method (200) of selecting a phase difference in a transmit diversity communication system using an antenna selection signal. One or more signals may be transmitted by at least two antennas alternatingly using two phase differences, for example, phase differences A and B (210), using an antenna selection protocol. It will be understood that a transmit diversity signal with a phase difference as used herein refers to a signal transmitted simultaneously over two or more antennas, where the phase difference represents the difference between the phase of the signal transmitted on the antennas. Thus, in the case of two antennas, one transmitting with 20° phase, and the other transmitting with 100° phase, the phase difference is 80°.

Thus, according to embodiments of the invention, where the antenna selection protocol requires transmission using a first antenna, the transmitter of the present invention may transmit a diversity signal using a first phase difference. Where the antenna selection protocol requires transmission using a second antenna, the transmitter of the present invention may transmit a diversity signal using a second phase difference. The receiver may treat these transmissions using the first and second phase differences as transmissions using two different antennas, and transmit an antenna selection signal. It will be understood that according to the method of the present invention, substantial modification to the antenna selection protocol is not required in order to use the protocol for selection of a transmit diversity parameter value, for example, phase difference.

Accordingly, the antenna selection feedback signal may be used by the transmitter as a phase difference selection feedback, and commence to transmit data using a phase difference determined by the phase difference indicated as preferred by the base station. The method of the present invention may use any of a variety of calculations in determining what first and second phase differences to transmit. For example, the first and second phase differences may represent a perturbation, and the method of the present invention may be performed at a perturbation rate with reference to the adjusted nominal value. The techniques described in US Patent Publication No. 2003/0002594, entitled "Communication Device with Smart Antenna Using a Quality-Indication Signal" and published Jan. 2, 2003, which is incorporated in its entirety herein, may be used in conjunction with the present invention.

The antenna selection signal may be received from the receiver (220) indicating which "antenna," i.e., transmit diversity signal, is preferable.

Based on the indication of the antenna selection signal sent by the receiver, the transmitter may calculate a desired phase difference (230). This calculation may be performed, for example, using a processor. Embodiments of the method of the present invention may calculate the phase difference using any of a variety of methods. In one embodiment, the calculation may select the phase difference corresponding to the antenna selected by the receiver as preferred. In another embodiment, the calculation may be to select a phase difference at an interval in the direction of the preferred phase difference. For example, if the antenna selection signal shows a preference for a phase difference of 40° over a phase difference of 30°, the calculation may be to set the phase difference at an interval, for example, 10° in the direction of 40°, i.e., the phase difference may be set to 50°. Some embodiments may calculate a phase difference based on a memory of previous phase differences and/or antenna selection signals, using interpolation or other calculation methods. Other embodiments are possible in which a phase difference may be calculated based on the antenna selection signal.

After calculating the desired phase difference, the transmitter may transmit a data signal using the calculated phase difference (240). The process may be repeated (250) as required by the antenna selection protocol, for example, every frame, every slot, every N slots, etc.

An apparatus embodying the present invention may include a processor to receive the antenna selection signal and calculate a desired phase difference. The apparatus may include a memory for storing previous phase differences and/or antenna selection signals received in response thereto. The apparatus may further include a phase difference module to implement the phase difference required by the processor. The apparatus may include power amplifiers and antennas for each transmit path.

A system in accordance with the present invention may include a receiver to receive the first and second transmit diversity signals using a first and second phase difference, and perform a calculation to determine which of the first and second diversity signals is preferred, and to transmit an antenna selection signal to the transmitter indicating such.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, any mobile communication protocol may be used, for example, CDMA or other types of protocols. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

What is claimed is:

1. A method of selecting a value of a transmit diversity parameter by a mobile device having a first and a second antenna comprising:
   transmitting a first signal concurrently on said first and second antennas, wherein transmissions of said first signal from said first and second antennas differ by a first value of a transmit diversity parameter;
   transmitting an indication that said first signal is transmitted on said first antenna;
   transmitting a second signal concurrently on said first and second antennas, wherein transmissions of said second signal from said first and second antennas differ by a second value of said transmit diversity parameter;
   transmitting an indication that said second signal is transmitted on said second antenna;
   receiving an antenna selection signal from a second communication device indicating a preference between said first signal and said second signal; and
   selecting a value of the transmit diversity parameter based on the indicated preference between said first signal and said second signal.

2. The method of claim 1, wherein said transmit diversity parameter is a phase difference between said first and second antennas.

3. The method of claim 1, wherein said transmit diversity parameter is a power ratio between said first and second antennas.

4. A mobile device comprising:
   first and second antennas;
   a transmit diversity adjustment module to receive a transmit diversity parameter value and send to a first and a second antenna signals differing by said value of the transmit diversity parameter; and
   a processor to control the value of said transmit diversity parameter, wherein said processor is to:
      cause to be transmitted a first signal concurrently on said first and second antennas, wherein transmissions of said first signal from said first and second antennas differ by a first value of a transmit diversity parameter;
      cause to be transmitted an indication that said first signal is transmitted on said first antenna;
      cause to be transmitted a second signal concurrently on said first and second antennas, wherein transmissions of said second signal from said first and second antennas differ by a second value of said transmit diversity parameter;
      cause to be transmitted an indication that said second signal is transmitted on said second antenna;
      receive an antenna selection signal from a second communication device indicating a preference between said first signal and said second signal; and
      select a value of the transmit diversity parameter based on the indicated preference between said first signal and said second signal.

5. The mobile device of claim 4, wherein said transmit diversity parameter is a phase difference between said first and second antennas.

6. The mobile device of claim 4, wherein said transmit diversity parameter is a power ratio between said first and second antennas.

* * * * *